(12) United States Patent
Kakuya et al.

(10) Patent No.: US 7,351,355 B2
(45) Date of Patent: Apr. 1, 2008

(54) PURIFYING AGENT FOR PURIFYING SOIL OR GROUND WATER, PROCESS FOR PRODUCING THE SAME, AND METHOD FOR PURIFYING SOIL OR GROUND WATER USING THE SAME

(75) Inventors: Koji Kakuya, Ube (JP); Masayuki Uegami, Ube (JP); Junichi Kawano, Onoda (JP); Tomoko Okita, Hatsukaichi (JP); Kenji Okinaka, Ube (JP); Andreas D. Jazdanian, Valparaiso, IN (US)

(73) Assignee: Toda Kogyo Corporation, Hiroshima-ken (JP)

( * ) Notice: Subject to any disclaimer, the term of this patent is extended or adjusted under 35 U.S.C. 154(b) by 417 days.

(21) Appl. No.: 10/998,194

(22) Filed: Nov. 29, 2004

(65) Prior Publication Data

US 2006/0113255 A1    Jun. 1, 2006

(51) Int. Cl.
*C02F 1/70* (2006.01)
*A62D 3/34* (2007.01)
*B01F 3/12* (2006.01)

(52) U.S. Cl. .................. 252/178; 252/176; 516/78; 588/405; 588/406

(58) Field of Classification Search ............. 252/176, 252/178; 516/78; 588/405, 406
See application file for complete search history.

(56) References Cited

U.S. PATENT DOCUMENTS

| | | | |
|---|---|---|---|
| 5,284,512 A * | 2/1994 | Koskan et al. | ............ 106/416 |
| 6,271,168 B1 | 8/2001 | Imai et al. | |
| 6,276,287 B1 | 8/2001 | Imai et al. | |
| 6,459,012 B1 | 10/2002 | Imai et al. | |
| 6,596,190 B1 | 7/2003 | Igawa et al. | |
| 6,663,840 B2 | 12/2003 | Imai et al. | |
| 6,800,587 B2 | 10/2004 | Imai et al. | |
| 7,022,256 B2 | 4/2006 | Uegami et al. | |
| 7,220,366 B2 * | 5/2007 | Uegami et al. | ............ 252/181 |
| 2003/0039857 A1 | 2/2003 | Zhang et al. | |
| 2003/0217974 A1 | 11/2003 | Uegami et al. | |
| 2004/0226404 A1 | 11/2004 | Ozaki et al. | |
| 2006/0070958 A1 * | 4/2006 | Kakuichi et al. | ............ 210/749 |
| 2006/0081811 A1 * | 4/2006 | Matsui et al. | ............ 252/175 |
| 2006/0113255 A1 * | 6/2006 | Kakuya et al. | ............ 210/747 |
| 2006/0151398 A1 * | 7/2006 | Uegami et al. | ............ 210/722 |
| 2006/0163172 A1 * | 7/2006 | Uegami et al. | ............ 210/749 |

FOREIGN PATENT DOCUMENTS

| | | |
|---|---|---|
| EP | 0 821 054 A2 | 1/1998 |
| EP | 1 151 807 A1 | 11/2001 |
| EP | 1 318 103 A2 | 6/2003 |
| EP | 1 486 463 A2 | 12/2004 |
| JP | 10-071386 | 3/1998 |
| JP | 2001-198567 | 7/2001 |
| WO | WO 94/19409 | 9/1994 |

* cited by examiner

*Primary Examiner*—Daniel S Metzmaier
(74) *Attorney, Agent, or Firm*—Nixon & Vanderhye P.C.

(57) ABSTRACT

A purifying agent for purifying soil or ground water which comprises a water suspension containing iron composite particles comprising $\alpha$-Fe and magnetite, and having an average particle diameter of 0.05 to 0.50 μm, an S content of 3500 to 10000 ppm and an Al content of 0.10 to 1.50% by weight, and polyaspartic acid or a salt thereof. The purifying agent is capable of decomposing aliphatic organohalogen compounds or aromatic organohalogen compounds contained in the soil or ground water in an efficient, continuous and economical manner.

6 Claims, 1 Drawing Sheet

FIGURE

PURIFYING AGENT FOR PURIFYING SOIL OR GROUND WATER, PROCESS FOR PRODUCING THE SAME, AND METHOD FOR PURIFYING SOIL OR GROUND WATER USING THE SAME

BACKGROUND OF THE INVENTION

The present invention relates to a purifying agent for purifying soil or ground water, a process for producing the purifying agent, and a method for purifying soil or ground water using the purifying agent. More particularly, the present invention relates to a purifying agent for purifying soil or ground water which can decompose aliphatic organohalogen compounds such as dichloromethane, carbon tetrachloride, 1,2-dichloroethane, 1,1-dichloroethylene, cis-1,2-dichloroethylene, 1,1,1-trichloroethane, 1,1,2-trichloroethane, trichloroethylene, tetrachloroethylene and 1,3-dichloropropene, and aromatic organohalogen compounds such as dioxins and PCB, which are contained in soil or ground water, in an efficient, continuous and economical manner; a process for producing the purifying agent; and a method for purifying the soil or ground water using the purifying agent.

The above aliphatic organohalogen compounds such as trichloroethylene and tetrachlordethylene have been extensively used for cleaning in semiconductor-manufacturing factories and for degreasing metals to be machined.

On the other hand, waste gases, fly ashes and main ashes discharged from incineration furnaces for combusting municipal garbage or industrial wastes, contain aromatic organohalogen compounds such as dioxins having an extremely high toxicity to human bodies even in a trace amount. The waste gases or fly ashes continuously stay around the incineration furnace, so that the dioxins still remain in soil of surrounding regions. Meanwhile, the "dioxins" are a generic name of such compounds formed by replacing hydrogen atoms of dibenzo-p-dioxine, dibenzofuran, etc., with chlorine atoms.

Further, PCB (polychlorinated biphenyl) as the aromatic organohalogen compound has been used in many application as insulating oils for transformers and capacitors, plasticizers or heating medium because of high chemical and thermal stability and excellent electrical insulating property thereof. Since the PCB is very harmful to human bodies, the production and use thereof has been presently prohibited. However, any effective PCB-treating method has not conventionally been established until now and, therefore, a large part of the PCB past used has still been stored without treatment or disposal.

The organohalogen compounds such as aliphatic organohalogen compounds and aromatic organohalogen compounds are hardly decomposable and besides exhibit carcinogenesis as well as a strong toxicity. Therefore, there arises such a significant environmental problem that soil or ground water is contaminated with these organohalogen compounds.

More specifically, upon discharge of the above organohalogen compounds, soil is contaminated with the hardly-decomposable organohalogen compounds, thereby further causing contamination of ground water by the organohalogen compounds. In addition, the contaminated ground water flows out from the contaminated soil and spreads over the surrounding regions, so that the problem of pollution by the organohalogen compounds is caused over wider areas.

The soil is once contaminated with the organohalogen compounds, land involving such soil cannot be reused and developed again. Therefore, there have been proposed various purification methods of purifying the soil and ground water contaminated with the organohalogen compounds. However, since the organohalogen compounds are hardly decomposable and a large amount of soil and ground water must be purified, any efficient and economical purifying techniques or methods have not been fully established.

For example, as the method of purifying soil contaminated with the organohalogen compounds, there are known a purifying method of using various catalysts; a method of absorbing and removing vapors of the organohalogen compounds by utilizing a volatility thereof; a thermal decomposition method of heat-treating excavated soil to convert the soil into harmless one; a method of purifying the soil by microorganisms; or the like. In addition, as to the ground water contaminated with the organohalogen compounds, there are known a method of extracting the contaminated ground water out of soil and converting the ground water into harmless one; a method of pumping the contaminated ground water and removing the organohalogen compounds therefrom; or the like.

Among these conventional methods of purifying soil or ground water contaminated with the organohalogen compounds, there have been proposed many methods of purifying the soil or ground water contaminated with the organohalogen compounds into harmless ones by mixing and contacting the soil or ground water with a purifying agent composed of iron-based particles.

For example, there is described a method of adding and mixing in soil, iron particles containing carbon in an amount of not less than 0.1% by weight to convert organohalogen compounds contained in the soil into harmless ones (Japanese Patent Application Laid-Open (KOKAI) No. 11-235577(1999)). Although in the method of the above Japanese Patent Application KOKAI, iron particles having specified specific surface area and particle size are used, since the particle size thereof is too large, it may be difficult to fully decompose the organohalogen compounds. Further, in the in-situ purification, the iron particles may fail to show a sufficient penetrability into soil.

There is described a soil-purifying agent composed of a water suspension containing iron particles having an average particle diameter of 1 to 500 µm (Japanese Patent Application Laid-Open (KOKAI) No. 2001-38341). However, since the iron particles used have a too large particle size, it may be difficult to fully decompose the organohalogen compounds. Further, in the in-situ purification, the iron particles have failed to show a sufficient penetrability into soil. Also, the soil-purifying agent contains, in addition to the iron particles, at least one of hydrophilic polymers, metal halides and inorganic carbonates. The hydrophilic polymers have a function for covering the iron particles to prevent contact between the iron particles and oxygen in air, whereas the metal halides have a function as a reducing agent (rust-preventive agent) for breaking immobilized oxidized portions of the iron particles, and the inorganic carbonates are used for the purpose of insolubilizing eluted Fe. Accordingly, the above Japanese Patent Application KOKAI is quite different in technical and inventive concept from the present invention.

There is described a method of using a water suspension containing spherical iron particles having an average particle diameter of less than 10 µm (Japanese Patent Application Laid-Open (KOKAI) No. 2001-198567). However, the water suspension containing the spherical iron particles is obtained by collecting dusts contained in waste gas produced during a refining process from an oxygen blowing converter for steel-making in which oxygen is blown into pig iron containing C, Si, P, etc., as impurities to refine the pig iron, and removing gases from the dusts. For this reason, it is suggested that the resultant spherical iron particles also contain impurities such as C, Si and P in the form of an oxide and, therefore, may fail to show a high purification ability to the organohalogen compounds.

There is described a method of purifying soil or ground water contaminated with organohalogen compounds using sulfur-containing iron particles (Japanese Patent Application Laid-Open (KOKAI) No. 2002-210452). However, since the iron particles thereof have a too large particle size, it may be difficult to fully reduce the organohalogen compounds. Further, since the iron particles used in the above method are obtained by atomizing a molten steel with water, it is suggested that the resultant iron particles usually contain a large amount of impurities derived from the molten steel. Therefore, the iron particles thereof may fail to show a high purification ability to the organohalogen compounds.

There is described a soil-purifying agent composed of a water suspension containing fine iron particles having an average particle diameter of 0.1 to 500 μm (Japanese Patent Application Laid-Open (KOKAI) No. 2002-282834). However, since the fine iron particles contain no sulfur, the resultant soil-purifying agent may fail to fully decompose and remove the organohalogen compounds. Further, the soil-purifying agent contains, in addition to the iron particles, at least one of amino acids, hydrophilic binders, metal halides and inorganic carbonates. The amino acids have a function of adsorbing the fine iron particles therein and facilitating the contact between the fine iron particles and contaminants such as organohalogen compounds, and the hydrophilic binders have a function of covering the fine iron particles to prevent the contact between the fine iron particles and oxygen in air. Whereas, the metal halides have a function as a reducing agent (rust-preventive agent) for breaking immobilized oxidized portions of the fine iron particles, and the inorganic carbonates are added for the purpose of insolubilizing the eluted Fe. Accordingly, the above Japanese Patent Application is quite different in technical and inventive concept from the present invention.

Also, there is described a method of using magnetite-containing iron composite particles for purifying soil or ground water contaminated with organohalogen compounds (Japanese Patent Application Laid-Open (KOKAI) No. 2002-317202). However, since the iron composite particles used contain no sulfur, it may be difficult to fully reduce the organohalogen compounds.

There is described a purification method using a water suspension containing metallic iron particles (U.S. Pat. No. 5,857,810). However, the metallic iron particles used in the above method have a particle size as large as 1 to 5 μm. Therefore, the metallic iron particles having such a large particle size may fail to fully decompose the organohalogen compounds. Further, in the in-situ purification, the metallic iron particles may fail to show a sufficient penetrability into soil.

There is described a soil-purifying agent composed of a water suspension containing iron particles having an average particle diameter of 1 to 200 μm (International Patent Application Laid-Open No. WO 01/008825). However, since the iron particles used have a too large particle size, it may be difficult to fully decompose the organohalogen compounds. Further, in the in-situ purification, the iron particles used may fail to show a sufficient penetrability into soil. Also, the soil-purifying agent contains, in addition to the iron particles, at least one of hydrophilic binders, metal halides and inorganic carbonates. The hydrophilic binders have a function of covering the iron particles to prevent the contact between the iron particles and oxygen in air, whereas the metal halides have a function as a reducing agent (rust-preventive agent) for breaking immobilized oxidized portions of the iron particles, and the inorganic carbonates are added for the purpose of insolubilizing eluted Fe. Accordingly, the invention of the above International Patent Application is quite different in technical and inventive concept from the present invention. Further, the water suspension containing the spherical iron particles is obtained by collecting dusts contained in waste gas produced during a refining process from an oxygen blowing converter for steel-making in which oxygen is blown into pig iron containing C, Si, P, etc., as impurities to refine the pig iron, and removing gases from the dusts. For this reason, it is suggested that the resultant spherical iron particles also contain impurities such as C, Si and P in the form of an oxide and, therefore, may fail to show a high purification ability to the organohalogen compounds.

There is described a soil-purifying agent composed of a water suspension containing nanometer-order metal particles produced from sodium boron hydride and iron chloride (International Patent Application Laid-Open No. WO 03/013252). However, in the above soil-purifying agent, boron derived from the raw material tends to remain in the particles and be eluted out therefrom. Therefore, the use of the soil-purifying agent tends to have problems concerning safety. Further, it is required to adhere noble metals such as Pd and Pt onto a surface layer of the nanometer-order metal particles in order to improve a purification ability thereof, so that the resultant soil-purifying agent tends to become expensive.

There are described the methods for purifying soil or ground water contaminated with organohalogen compounds using a composite of magnetite and iron (Japanese Patent Application Laid-open Nos. 2003-230876, 2004-058051, 2004-082102 and 2004-83086). However, in these methods, since the use of polyaspartic acid or salt thereof is not taken into consideration, the purifying agent may fail to fully penetrate into soil depending upon configurations of the soil.

As a result of the present inventors' earnest studies for solving the above problems, it has been found that the water suspension obtained by heat-reducing goethite particles having specific average major axis diameter, Al content and S content or hematite particles having specific average major axis diameter, Al content and S content, at a temperature of 350 to 600° C. to produce iron particles; forming a surface oxidation layer at the surface of the iron particles; adding an aqueous solution containing a specific amount of polyaspartic acid or salt thereof to the obtained iron composite particles; and mixing and stirring the mixture, is unexpectedly capable of treating organohalogen compounds and/or heavy metals contained in soil or ground water in an efficient, continuous and economical manner. The present invention has been attained on the basis of this finding.

SUMMARY OF THE INVENTION

An object of the present invention is to provide a purifying agent for purifying soil or ground water, which is capable of treating organohalogen compounds contained in the soil or ground water at the in-situ position in an efficient, continuous and economical manner, as well as a process for producing the purifying agent.

Another object of the present invention is to provide a method for purifying soil or ground water by treating organohalogen compounds contained in the soil or ground water.

To accomplish the aims, in a first aspect of the present invention, there is provided a purifying agent for purifying soil or ground water, comprising a water suspension containing:

(a) iron composite particles comprising α-Fe and magnetite, and having an average particle diameter of 0.05 to 0.50 μm, an S content of 3500 to 10000 ppm and an Al content of 0.10 to 1.50% by weight; and (b) polyaspartic acid or a salt thereof.

In a second aspect of the present invention, there is provided a purifying agent for purifying soil or ground water, comprising a water suspension containing:

(a) iron composite particles comprising α-Fe and magnetite, and having an average particle diameter of 0.05 to 0.50 μm, an S content of 3500 to 10000 ppm and an Al content of 0.10 to 1.50% by weight;

(b) polyaspartic acid or a salt thereof; and (c) sodium hydrogen carbonate and/or sodium sulfate.

In a third aspect of the present invention, there is provided a dilute purifying agent for purifying soil or ground water, comprising a water suspension containing:

(a) iron composite particles comprising α-Fe and magnetite, and having an average particle diameter of 0.05 to 0.50 μm, an S content of 3500 to 10000 ppm and an Al content of 0.10 to 1.50% by weight; and (b) polyaspartic acid or a salt thereof, wherein the amount of the iron composite particles (as a solid content) in the purifying agent is 0.1 to 200 g/L.

In a fourth aspect of the present invention, there is provided a dilute purifying agent for purifying soil or ground water, comprising a water suspension containing:

(a) iron composite particles comprising α-Fe and magnetite, and having an average particle diameter of 0.05 to 0.50 μm, an S content of 3500 to 10000 ppm and an Al content of 0.10 to 1.50% by weight;

(b) polyaspartic acid or a salt thereof; and (c) sodium hydrogen carbonate and/or sodium sulfate, wherein the amount of the iron composite particles (as a solid content) in the purifying agent is 0.1 to 200 g/L, and the amount of sodium hydrogen carbonate, sodium sulfate or a mixture thereof (as a solid content) in the purifying agent is 0.01 to 1.0% by weight.

In a fifth aspect of the present invention, there is provided a process for producing a purifying agent for purifying soil or ground water, comprising:

heat-reducing goethite particles having an average major axis diameter of 0.05 to 0.50 μm, an Al content of 0.06 to 1.00% by weight and an S content of 2200 to 5500 ppm or hematite particles having an average major axis diameter of 0.05 to 0.50 μm, an Al content of 0.07 to 1.13% by weight and an S content of 2400 to 8000 ppm, at a temperature of 350 to 600° C. to produce iron particles;

forming a surface oxidation layer at the surface of the iron particles in a gas phase and then transferring the resultant particles into water, or transferring directly the iron particles into water and then forming a surface oxidation layer at the surface of the iron particles in the water to form a water suspension containing iron composite particles;

adding an aqueous solution of polyaspartic acid or a salt thereof to the water suspension such that a concentration of the polyaspartic acid or salt thereof is 5 to 50% by weight based on the weight of the iron composite particles; and mixing and stirring the resultant mixture.

In a sixth aspect of the present invention, there is provided a method for purifying soil or ground water, comprising:

mixing and contacting the soil contaminated with organohalogen compounds or the ground water contaminated with organohalogen compounds, with the purifying agent as defined above.

In a seventh aspect of the present invention, there is provided a method for purifying soil or ground water, comprising:

directly injecting the purifying agent as defined above into the soil contaminated with organohalogen compounds or the ground water contaminated with organohalogen compounds at the in-situ position to contact the purifying agent with the soil or ground water.

DETAILED DESCRIPTION OF THE INVENTION

Figure 1:
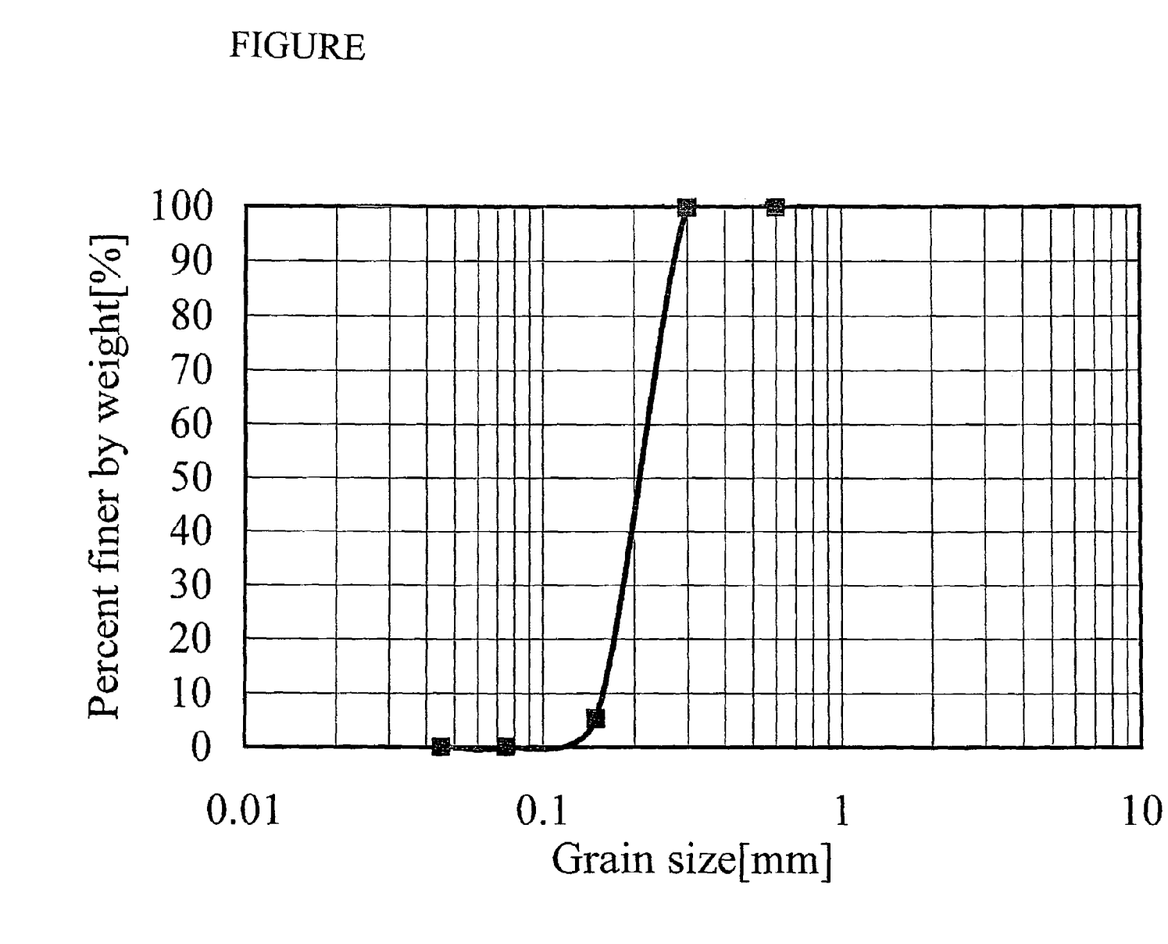
The FIGURE is a graph showing a particle size distribution of quartz sand used in a Penetrability Test.

The present invention is described in detail below. First, the purifying agent for purifying soil or ground water according to the present invention (hereinafter referred to merely as "purifying agent") is described.

The purifying agent of the present invention comprises a water suspension containing:

(a) iron composite particles comprising α-Fe and magnetite, and having an average particle diameter of 0.05 to 0.50 μm, an S content of 3500 to 10000 ppm and an Al content of 0.10 to 1.50% by weight; and (b) polyaspartic acid or a salt thereof.

The iron composite particles used in the present invention are composed of an α-Fe phase and a magnetite ($Fe_3O_4$) phase. The $Fe_3O_4$ content in the iron composite particles is adjusted such that the ratio of a diffraction intensity $D_{110}$ of (110) plane of α-Fe to a sum of a diffraction intensity $D_{311}$ of (311) plane of $Fe_3O_4$ and the diffraction intensity $D_{110}$ ($D_{110}/(D_{311}+D_{110})$) is usually 0.30 to 0.95, preferably 0.32 to 0.95 as measured from X-ray diffraction spectrum of the iron composite particles. When the intensity ratio ($D_{110}/(D_{311}+D_{110})$) of the iron composite particles immediately after production thereof is less than 0.30, the iron composite particles tend to be insufficient in purification ability for the organohalogen compounds because of too low α-Fe phase content therein, thereby failing to fully attain the aimed effects of the present invention. When the intensity ratio ($D_{110}/(D_{311}+D_{110})$) is more than 0.95, although the content of the α-Fe phase is sufficient, the content of the $Fe_3O_4$ phase in the iron composite particles tends to be lowered, so that the iron composite particles tend to be early deteriorated in catalytic activity, and it is not possible to maintain a good catalytic activity thereof for a long period of time, thereby also failing to attain the aimed effects of the present invention. In addition, $Fe_3O_4$ is preferably present at the vicinity of the surface of the iron composite particles.

The iron composite particles used in the present invention have an average particle diameter of usually 0.05 to 0.50 μm, preferably 0.05 to 0.30 μm. When the average particle diameter of the iron composite particles is less than 0.05 μm, the α-Fe phase tends to become unstable, resulting in formation of a thick oxidation layer at the surface thereof, so that it may be difficult to increase the α-Fe phase content and fully attain the aimed effects of the present invention. When the average particle diameter of the iron composite particles is more than 0.50 μm, although the α-Fe phase content is increased, it may be difficult to retain the $Fe_3O_4$ phase content to such an extent capable of attaining the aimed effects of the present invention.

The S content of the iron composite particles used in the present invention is usually 3500 to 10000 ppm, preferably 3800 to 10000 ppm, more preferably 3800 to 9500 ppm. When the S content is less than 3500 ppm, the obtained iron composite particles tend to be insufficient in purification ability for the organohalogen compounds, thereby failing to attain the aimed effects of the present invention. When the S content is more than 10000 ppm, although the obtained iron composite particles show a sufficient purification ability for the organohalogen compounds, the use of such a large S content is uneconomical.

The Al content of the iron composite particles used in the present invention is usually 0.10 to 1.50% by weight, preferably 0.20 to 1.20% by weight. When the Al content is less than 0.10% by weight, the obtained iron composite particles tend to provide a hard granulated product due to volume shrinkage thereof, so that wet pulverization thereof tends to be difficult. When the Al content is more than 1.50% by weight, the reduction reaction tends to proceed too slowly and, therefore, require a long period of time. In addition, since crystal growth of the iron composite particles is insufficient, the α-Fe phase contained therein tends to become unstable, and a too thick oxidation layer tends to be formed on the surface of the particles. Further, since the phase change from the $Fe_3O_4$ phase to the α-Fe phase is insufficient upon the heat reduction reaction, it may be difficult to enhance the α-Fe phase content, thereby failing to attain the aimed effects of the present invention.

The iron composite particles used in the present invention usually have a granular shape. In the present invention, since spindle-shaped or acicular goethite or hematite particles are directly subjected to heat reduction treatment, the particles undergo breakage of particle shape upon transformation into the α-Fe phase crystals, and are formed into a granular shape through isotropic crystal growth thereof. On the contrary, spherical particles have a smaller BET specific surface area than that of granular particles if the particle sizes thereof are identical, and, therefore, exhibit a less catalytic activity than that of the granular particles. Therefore, the iron composite particles preferably contain no spherical particles.

The crystallite size of (110) plane of α-Fe of the iron composite particles used in the present invention is usually 200 to 400 Å, preferably 200 to 350 Å. When the crystallite size is less than 200 Å, it may be difficult to increase the α-Fe phase content, thereby failing to fully attain the aimed effects of the present invention. When the crystallite size is more than 400 Å, although the α-Fe phase content is increased, it may be difficult to retain the $Fe_3O_4$ phase content to such an extent capable of attaining the aimed effects of the present invention.

The BET specific surface area value of the iron composite particles used in the present invention is usually 5 to 60 $m^2/g$, preferably 7 to 55 $m^2/g$. When the BET specific surface area value is less than 5 $m^2/g$, the contact area of the iron composite particles tends to be decreased, thereby failing to show a sufficient catalytic activity. When the BET specific surface area value is more than 60 $m^2/g$, it may be difficult to increase the α-Fe phase content, thereby failing to fully attain the aimed effects of the present invention.

The iron composite particles used in the present invention have a saturation magnetization value of usually 85 to 190 $Am^2/kg$ (85 to 190 emu/g), preferably 90 to 190 $Am^2/kg$ (90 to 190 emu/g). When the saturation magnetization value of the iron composite particles immediately after production thereof is less than 85 $Am^2/kg$, the α-Fe phase content of the iron composite particles tends to be lowered, thereby failing to fully attain the aimed effects of the present invention. When the saturation magnetization value is more than 190 $Am^2/kg$, although the α-Fe phase content is increased, it may be difficult to maintain the $Fe_3O_4$ phase content to such an extent capable of attaining the aimed effects of the present invention.

The iron composite particles used in the present invention have an Fe content of usually not less than 75% by weight, preferably 75 to 98% by weight, more preferably 75 to 90% by weight based on the weight of the whole particles. When the Fe content of the iron composite particles immediately after production thereof is less than 75% by weight, the iron composite particles tend to be deteriorated in catalytic activity, so that it may be difficult to attain the aimed effects of the present invention.

The iron composite particles used in the present invention preferably contain substantially no metal elements such as Pb, Cd, As, Hg, Sn, Sb, Ba, Zn, Cr, Nb, Co, Bi, etc., since these metal elements exhibit a toxicity. In particular, in the consideration of high purity and catalyst ability, the iron composite particles used the present invention preferably have a cadmium elution of not more than 0.01 mg/L; no detected elution of whole cyanogen; a lead elution of not more than 0.01 mg/L; a chromium elution of not more than 0.05 mg/L; an arsenic elution of not more than 0.01 mg/L; a whole mercury elution of not more than 0.0005 mg/L; a selenium elution of not more than 0.01 mg/L; a fluorine elution of not more than 0.8 mg/L; and a boron elution of not more than 1 mg/L, when the amounts of the respective metals eluted are measured by the below-mentioned methods.

Also, the iron composite particles used in the present invention preferably have a cadmium content of not more than 0.01 mg/L; no whole cyanogen content; a lead content of not more than 0.01 mg/L; a chromium content of not more than 0.05 mg/L; an arsenic content of not more than 0.01 mg/L; a whole mercury content of not more than 0.0005 mg/L; a selenium content of not more than 0.01 mg/L; a fluorine content of not more than 0.8 mg/L; and a boron content of not more than 1 mg/L, when the contents of the respective metals are measured by the below-mentioned methods.

In the purifying agent of the present invention, the solid content of the iron composite particles in the purifying agent is not particularly restricted. In the consideration of industrial productivity, the solid content of the iron composite particles in the purifying agent is usually 10 to 30% by weight, preferably 15 to 30% by weight. When the solid content of the iron composite particles is more than 30% by weight, the obtained purifying agent tends to show an increased viscosity, so that it may be difficult to apply a mechanical load thereto upon stirring and, therefore, uniformly mix the respective components with each other, resulting in poor control of the concentration of the purifying agent.

The purifying agent of the present invention can be remarkably improved in penetrability into soil as compared to the conventional purifying agents, by incorporating thereinto the polyaspartic acid or salt thereof as an additive.

In the purifying agent of the present invention, the content (solid content) of the polyaspartic acid or salt thereof as an additive is usually 5 to 50% by weight, preferably 5 to 30% by weight based on the weight of the iron composite particles contained in the purifying agent. When the content of the polyaspartic acid or salt thereof is less than 5% by weight, the resultant purifying agent tends to be insufficient in penetrability into soil due to too low content of the polyaspartic acid or salt thereof in the purifying agent. On the other hand, when the content of the polyaspartic acid or salt thereof is more than 50% by weight, the viscosity of the obtained purifying agent tends to be increased, resulting in deterioration in industrial productivity thereof. Further, since the penetrability of the purifying agent into soil upon injection also tends to be lowered, it may be difficult to attain the aimed effects of the present invention.

The polyaspartic acid or salt thereof used in the present invention has a molecular weight of usually 2000 to 200000, preferably 3000 to 150000. Also, in the present invention preferred is the polyaspartic acid or salt thereof showing an alkaline. Specific examples of the polyaspartic acid or salt thereof may include sodium polyaspartate, etc.

Meanwhile, the polyaspartic acid or salt thereof has a biodegradability and, therefore, can undergo biodegradation by the action of microorganisms after injection into soil or ground water. Thus, since substantially no residues of the polyaspartic acid or salt thereof are accumulated in environment, the purifying agent containing the polyaspartic acid or salt thereof as an additive can be suitably used as an in-situ purifying agent.

Further, the purifying agent of the present invention may contain as an additive, in addition to sodium hydrogen carbonate and/or sodium sulfate, sodium carbonate, sodium sulfite, sodium hydrogen sulfite, etc.

Next, the dilute purifying agent for purifying soil or ground water according to the present invention is described.

The dilute purifying agent for purifying soil or ground water according to the present invention comprises a water suspension containing:

(a) iron composite particles comprising α-Fe and magnetite, and having an average particle diameter of 0.05 to 0.50 μm, an S content of 3500 to 10000 ppm and an Al content of 0.10 to 1.50% by weight; and (b) polyaspartic acid or a salt thereof;

wherein the amount of the iron composite particles (as a solid content) in the purifying agent is 0.1 to 200 g/L.

In the dilute purifying agent of the present invention, the solid content of the iron composite particles therein is usually 0.1 to 200 g/L, preferably 0.5 to 100 g/L.

In the dilute purifying agent of the present invention, in addition to the polyaspartic acid or salt thereof, sodium hydrogen carbonate and/or sodium sulfate may be added thereto as an additive. In the case where the sodium hydrogen carbonate and/or sodium sulfate are added to the purifying agent, it is possible to improve solution properties of the purifying agent, resulting in enhanced penetrability thereof into soil.

The content of sodium hydrogen carbonate and/or sodium sulfate in the dilute purifying agent of the present invention is usually 0.01 to 1.0% by weight, preferably 0.01 to 0.5% by weight based on the weight of the purifying agent. When the content of sodium hydrogen carbonate and/or sodium sulfate is less than 0.01% by weight, the resultant dilute purifying agent tends to be insufficient in penetrability into soil due to too low content of sodium hydrogen carbonate and/or sodium sulfate in the purifying agent.

Further, the dilute purifying agent of the present invention may contain as an additive, in addition to sodium hydrogen carbonate and/or sodium sulfate, sodium carbonate, sodium sulfite, sodium hydrogen sulfite, etc.

Next, the iron composite particles constituting the purifying agent of the present invention is described. It is preferred that secondary particles of the iron composite particles exhibit a particle size distribution with a single peak when the particle size distribution of the iron composite particles is measured by a laser diffractometer. When the particle size distribution of the secondary particles exhibits a plurality of peaks, the penetration velocity of the purifying agent into contaminated soil tends to become non-uniform, resulting in prolonged purification time, so that it may be difficult to attain the aimed effects of the present invention.

The secondary particles of the iron composite particles constituting the purifying agent of the present invention have a median diameter $D_{50}$ (particle diameter corresponding to an accumulative volume of particles of 50% as measured and accumulated with respect to respective particle diameters and expressed by percentage based on a total volume of the iron composite particles as 100%) of usually 0.5 to 5.0 μm, preferably 0.5 to 3.5 μm. Although the median diameter $D_{50}$ of the secondary particles is preferably as fine as possible, since the primary particles become finer particles and contain α-Fe, the resultant iron composite particles tend to be magnetically agglomerated. Also, the lower limit of the median diameter of the secondary particles of the iron composite particles is 0.5 μm from the industrial viewpoints. When the median diameter $D_{50}$ of the secondary particles is more than 5.0 μm, the penetration into contaminated soil tends to become too slow, so that it may be difficult to purify the soil for a short period of time and, therefore, attain the aimed effects of the present invention.

The secondary particles of the iron composite particles used in the purifying agent of the present invention have a ratio of $D_{90}$ to $D_{10}$ ($D_{90}/D_{10}$) of usually 1.0 to 5.0, preferably 1.0 to 3.5, wherein $D_{90}$ represents a particle diameter corresponding to an accumulative volume of particles of 90% as measured and accumulated with respect to respective particle diameters and expressed by percentage based on a total volume of the iron composite particles as 100% and $D_{10}$ represents a particle diameter corresponding to an accumulative volume of particles of 10% as measured and accumulated with respect to respective particle diameters and expressed by percentage based on a total volume of the iron composite particles as 100%. Although the above ratio ($D_{90}/D_{10}$) is preferably as small as possible since the penetration velocity into contaminated soil is equalized and the purification velocity also becomes uniform, the lower limit of the ratio ($D_{90}/D_{10}$) is 1.0 from the industrial viewpoints. When the ratio ($D_{90}/D_{10}$) is more than 5.0, the penetration velocity into contaminated soil tends to become non-uniform, resulting in poor purification ability and prolonged purification time, so that it may be difficult to attain the aimed effects of the present invention.

The secondary particles of the iron composite particles used in the purifying agent of the present invention have a distribution width $D_{84}$-$D_{16}$ of usually 0.5 to 5.0 μm, preferably 0.5 to 3.5 μm, wherein $D_{84}$ represents a particle diameter corresponding to an accumulative volume of particles of 84% as measured and accumulated with respect to respective particle diameters and expressed by percentage based on a total volume of the iron composite particles as 100%, and $D_{16}$ represents a particle diameter corresponding to an accumulative volume of particles of 16% as measured and accumulated with respect to respective particle diameters and expressed by percentage based on a total volume of the iron composite particles as 100%. Although the distribution width $D_{84}$-$D_{16}$ is preferably as small as possible since the penetration velocity into contaminated soil is equalized and, therefore, the purification velocity also becomes uniform, the lower limit of the distribution width $D_{84}$-$D_{16}$ is 0.5 μm from the industrial viewpoints. When the distribution width $D_{84}$-$D_{16}$ is more than 5.0 μm, the penetration velocity into contaminated soil tends to become non-uniform, resulting in poor purification ability and prolonged purification time, so that it may be difficult to attain the aimed effects of the present invention.

The specific gravity of the purifying agent according to the present invention is usually 1.2 to 1.4. When the specific gravity is less than 1.2, the purifying agent tends to be uneconomical owing to a less solid content therein in the consideration of transportation and amount added to soil, etc. When the specific gravity is more than 1.4, the purifying agent has a too high viscosity in view of diameters of the primary and secondary particles contained therein and, therefore, may be difficult to industrially produce.

Next, the process for producing the purifying agent according to the present invention is described.

The purifying agent of the present invention is produced by heat-reducing goethite particles or hematite particles to produce iron particles; (1) forming a surface oxidation layer at the surface of the iron particles in a gas phase and then transferring the resultant iron composite particles into water, or (2) transferring the iron particles into water and then forming a surface oxidation layer at the surface of the iron particles in the water, to produce a water suspension containing the iron composite particles; adding an aqueous solution of polyaspartic acid or a salt thereof to the obtained water suspension; and mixing and stirring the resultant mixture.

The goethite particles can be produced by ordinary methods, for example, by passing an oxygen-containing gas such as air through a suspension containing a ferrous-containing precipitate such as hydroxides or carbonates of iron, which is obtained by reacting a ferrous salt-containing aqueous solution with at least one compound selected from the group consisting of alkali hydroxides, alkali carbonates and ammonia.

Meanwhile, in order to obtain the iron composite particles having a less amount of impurities, as the ferrous salt-containing aqueous solution, there are preferably used high-purity solutions which are reduced in content of impurities such as heavy metals.

For reducing the amount of impurities contained in the ferrous salt-containing aqueous solution, there may be used, for example, a method in which a steel plate is washed with sulfuric acid to dissolve out, thereby removing impurities, rust-preventive oils or the like which are deposited on the surface thereof, and then the resultant impurity-free steel plate is dissolved to prepare a high-purity aqueous ferrous salt solution. Meanwhile, the use of materials obtained by acid-washing scrap irons containing a large amount of metal impurities other than iron, steel plates subjected to plating treatment, phosphate treatment or chromic acid treatment for improving corrosion resistance thereof, or steel plates coated with rust-preventive oils, is undesirable. This is because the impurities tend to remain in the iron composite particles obtained from an aqueous ferrous salt solution prepared by dissolving such materials, thereby causing such a risk that the impurities is eluted out from the iron composite particles into soil or ground water to be purified. Alternatively, there is also known a method of adding alkali such as alkali hydroxides to a ferrous sulfate solution by-produced from titanium oxide production process, etc., to adjust the pH value thereof, and insolubilize and precipitate titanium as well as other impurities in the from of hydroxides thereof, and then removing the resultant precipitates from the reaction solution by ultra-filtration, etc. Among these methods, the method of dissolving the steel plate having a less amount of impurities with sulfuric acid is preferred, and the method is more preferably followed by removing the impurities from the obtained aqueous ferrous salt solution by adjusting the pH value thereof. All of the above-described methods are industrially applicable without problems and are also advantageous from economical viewpoints.

The goethite particles used in the present invention have an average major axis diameter of usually 0.05 to 0.50 μm and an S content of usually 2200 to 5500 ppm, and may be either spindle-shaped particles or acicular particles. In addition, the goethite particles have an aspect ratio of usually 4:1 to 30:1, more preferably 5:1 to 25:1, and a BET specific surface area of usually 20 to 200 $m^2$/g, preferably 25 to 180 $m^2$/g.

In the present invention, it is important to incorporate Al into the goethite particles or coat the goethite particles with Al. The incorporation or coating of Al allows a granulated product of the goethite particles to inhibit a volume shrinkage, resulting in well-controlled hardness of the granulated product. Therefore, the energy required for wet pulverization of the granulated product of the goethite particles can be saved. Further, the size of primary particles of the goethite particles can be relatively reduced, resulting in relatively large specific surface area thereof as well as enhancement in ability thereof.

The amount of Al incorporated into or coated on the goethite particles is usually 0.06 to 1.00% by weight.

Meanwhile, the goethite particles are preferably previously granulated by ordinary methods. The granulated goethite particles become usable in a fixed bed-type reducing furnace. Further, the iron composite particles obtained from the granulated goethite particles can still maintain a shape of the granulated product under some reducing conditions.

The hematite particles are obtained by heat-dehydrating the thus obtained goethite particles at a temperature of usually 250 to 350° C.

The high S content of the hematite particles used in the present invention can be obtained by using goethite particles previously having a high S content. Also, in the case of the goethite particles having a low S content, the S content of the hematite particles may be increased by adding sulfuric acid to a water suspension containing the hematite particles.

The thus obtained hematite particles have an average major axis diameter of 0.05 to 0.50 μm, and an S content of 2400 to 8000 ppm. The amount of Al contained in or coated on the hematite particles is usually 0.07 to 1.13% by weight.

The thus obtained goethite particles or hematite particles are heat-reduced at a temperature of 350 to 600° C. to produce iron particles.

When the heat-reducing temperature is less than 350° C., the reduction reaction tends to proceed too slowly, resulting in a prolonged reduction reaction time. Even though the BET specific surface area of the particles is increased under such a low temperature condition, a sufficient crystal growth of the particles tends to be inhibited, resulting in formation of unstable α-Fe phase and thick oxidation film on the surface of the particles, or insufficient phase change from $Fe_3O_4$ phase to α-Fe phase. As a result, it may be difficult to increase the α-Fe phase content. When the heat-reducing temperature is more than 600° C., the reduction reaction tends to proceed too rapidly, so that sintering within or between the particles is excessively accelerated, resulting in a too large particle size and a too small BET specific surface area of the obtained particles.

Meanwhile, as the heating atmosphere upon the reduction reaction, there may be used hydrogen gas, nitrogen gas or the like. Among these atmospheres, hydrogen gas is preferred from the industrial viewpoints.

The iron particles obtained by the heat-reduction may be treated by either a method (1) of first directly subjecting the iron particles to surface oxidation treatment in a gas phase, and then after cooling and drying, transferring the thus treated iron particles in water; or a method (2) of cooling and drying the iron particles without forming a surface oxidation layer at the surface thereof in a gas phase, transferring the iron particles into water, and then forming a surface oxidation layer at the surface of the iron particles in the water.

In the method (1) in which the surface oxidation layer is formed in the gas phase, a mixed gas of a nitrogen gas and a small amount of air is introduced into a reaction vessel at a low temperature to oxidize α-Fe present in the surface of the iron particles, thereby obtaining iron composite particles having a surface oxidation layer composed of $Fe_3O_4$. The oxidation temperature is preferably not more than 150° C. The iron composite particles used in the present invention contain Al and, therefore, can be easily divided into fine particles, so that it is possible to increase a surface area of the iron particles. Therefore, even when the surface oxidation layer is formed at the surface of the iron composite particles by gas-phase oxidation, the resultant iron composite particles can maintain a sufficient decomposition ability (purification ability).

As the cooling atmosphere, there may be used either nitrogen atmosphere or hydrogen atmosphere. However, at a final stage of the cooling, the atmosphere is preferably changed to nitrogen atmosphere. When the iron composite particles are transferred into water, the iron composite particles are preferably cooled to a temperature of not more than 100° C.

The drying atmosphere may be appropriately selected from nitrogen atmosphere, air, vacuum, etc. The drying temperature is preferably not more than 100° C.

On the other hand, in the method (2) in which the iron particles obtained by the heat-reduction are directly transferred into water without forming the surface oxidation layer in the gas phase, it is considered that water is decomposed into oxygen and hydrogen by a catalytic activity of α-Fe, and as a result, the α-Fe is oxidized by the oxygen generated so that an oxidation film composed of $Fe_3O_4$ is formed at the surface of the iron particles.

In both of the above methods, it is considered that the resultant particles as a whole are composed of the iron particles composed of an α-Fe phase and the oxidation film composed of $Fe_3O_4$, which is formed at the surface of the iron particles.

The purifying agent of the present invention is preferably in the form of a dispersion obtained by dispersing pulverized secondary agglomerates of the iron composite particles in water.

Thus, the iron composite particles obtained by transferring the prepared iron particles into water are preferably wet-pulverized in the consideration of agglomeration condition, properties (high-activity), particle size, capacity of pulverizer (particle size of product and amount to be pulverized) and final configuration of the iron composite particles.

As the pulverizer usable in the present invention, in the case where grinding media are employed, there may be used vessel-drive type mills, e.g., rolling mills such as pot mill, tube mill and conical mill, vibration mills such as fine vibration mill, or the like; and media-agitation type mills, e.g., tower type mills such as tower mill, agitation tank type mills such as attritor, flowing tube type mills such as sand grind mill, annular type mills such as annular mill, or the like. In the case where no grinding media are employed, there may be used shear/friction type mills, e.g., vessel rotating type mills such as Wong mill, wet high-speed rotation type mills such as colloid mill, homomixer and line mixer, or the like.

In general, the pulverization means a procedure of crushing raw materials having a size of not more than 25 mm into particles, and generally classified into coarse pulverization, minute pulverization and fine pulverization. The coarse pulverization is to pulverize the raw materials into particles having a size of 5 mm to 20 mesh, the minute pulverization is to pulverize the raw materials into particles containing small particles having a size of not more than 200 mesh in an amount of about 90%, and the fine pulverization is to pulverize the raw materials into particles containing fine particles having a size of not more than 325 mesh in an amount of about 90%. Further, there is known an ultrafine pulverization in which the raw materials are pulverized into several microns. In the present invention, the iron composite particles are preferably successively subjected to three pulverization treatments including the coarse pulverization, minute pulverization and fine pulverization.

The coarse pulverization may be carried out using a stirrer of a low-speed rotation type, a medium-speed rotation type, a high-speed rotation shearing type or a high-and low-speed combined rotation type which may be inserted into an agitation tank equipped with a baffle. In particular, in the consideration of pulverizing agglomerates of the iron composite particles used in the present invention, the medium-to high-speed rotation type stirrer that can be operated at 1000 to 6000 rpm is preferably used. As the blade of these stirrers, there may be used disk turbine, fan turbine, arrow feather-shaped turbine, propeller-type turbine, etc. Of these stirrers, preferred are edged disk turbines, for example, homodisper manufactured by Tokushu Kika Kogyo Co., Ltd.

The minute or fine pulverization may be carried out using a batch type apparatus or a continuous type apparatus. Of these apparatuses, the continuous type apparatus is preferred from the industrial viewpoints. The minute or fine pulverization using grinding media may be carried out using ball mill, tower mill, sand grind mill, attritor or the like. Also, the minute or fine pulverization using no grinding media may be carried out using homomixer, line mixer or the like.

In the minute pulverization, there may be used such a pulverizer having a multi-stage structure which includes the combination of a stator and a rotor provided at its outer periphery with a plurality of slits as a shaft-fixing surface portion to which cutter blades are fitted. In particular, a continuous shear dispersing apparatus such as media-less line mixer whose rotor is rotated at a peripheral speed of not less than 30 m/s, for example, "Homomic Line Mill" manufactured by Tokushu Kika Kogyo Co., Ltd., is preferred.

The fine pulverization (finish pulverization) may be carried out using a media type dispersing apparatus such as a sand grind mill in which a plurality of disks fitted on a rotating axis disposed at a center of a cylindrical vessel filled with φ1 to φ3 grinding media at a filling percentage of 70 to 80%, are rotated to cause a rapid rotation action of the media through which materials to be treated are passed from underneath to above. For example, as the sand grind mil, there may be preferably used a sand grinder manufactured by Imex Inc.

In the wet pulverization of the present invention, in order to accelerate formation of cracks in the particles and inhibition of rebinding the pulverized particles, in order to prevent the particles from being agglomerated into granular particles which are difficult to pulverize, or in order to prevent the particles from being adhered onto balls or mills which may cause deterioration in pulverizing force thereof, a suitable pulverizing assistants may be appropriately added to the particles to be pulverized. The pulverizing assistants may be in the form of either solid or liquid. Examples of the solid pulverizing assistants may include stearic acid salts, colloidal silica, colloidal carbon or the like. Examples of the liquid pulverizing assistants may include triethanolamine, alkyl sulfonates or the like.

The concentration of the iron composite particles contained in the water suspension upon the wet pulverization is usually 20 to 40% by weight. When the concentration of the iron composite particles is less than 20% by weight, it may be difficult to apply a suitable stress such as shear force upon the pulverization, thereby failing to pulverize the iron composite particles into the aimed particle size, or resulting in prolonged pulverization time which may cause the grinding media used in the wet pulverization to suffer from severe abrasion. When the concentration of the iron composite particles is more than 40% by weight, the water suspension may exhibit a too high viscosity, thereby requiring application of a large mechanical load, so that it may be difficult to industrially produce the aimed particles.

The polyaspartic acid or salt thereof is used in the form of an aqueous solution and, therefore, may be directly added to the water suspension containing the iron composite particles.

The sodium hydrogen carbonate and/or sodium sulfate may be added in a predetermined amount to the water suspension containing the iron composite.

Although the iron composite particles used in the present invention tend to be partially formed into coarse particles when preserved (stored) in water for a long period of time, the iron composite particles containing such coarse particles can still maintain substantially the same purification ability for the organohalogen compounds as the initial one. Therefore, in the present invention, the polyaspartic acid or salt thereof as well as the sodium hydrogen carbonate and/or sodium sulfate as additives may be added to the water suspension after preserving (storing) the iron composite particles in water for a long period of time.

More specifically, in the present invention, the iron composite particles preserved in the aqueous solution preferably exhibit the following properties, for example, after about 1 month from production thereof. That is, the iron composite particles contain coarse particles having a particle diameter of 0.1 to 0.3 μm, and have a ratio of a diffraction intensity $D_{110}$ of (110) plane of α-Fe to a sum of a diffraction intensity $D_{311}$ of (311) plane of magnetite and the diffraction intensity $D_{110}$ ($D_{110}/(D_{311}+D_{110})$) of 0.50 to 0.80 as measured from X-ray diffraction spectrum of the iron composite particles; a BET specific surface area value of 5.0 to 60 m$^2$/g; a saturation magnetization value of 100 to 140 Am$^2$/kg as measured with respect to the iron composite particles contained in the purifying agent; a crystallite size of (110) plane of α-Fe of 250 to 400 Å as measured with respect to the iron composite particles contained in the purifying agent; and an Fe content of 70 to 80% by weight as measured with respect to the iron composite particles contained in the purifying agent.

Also, the iron composite particles preserved in the aqueous solution preferably exhibit the following properties after about 3 months from production thereof. That is, the iron composite particles contain coarse particles having a particle diameter of 0.3 to 0.6 μm, and have the above intensity ratio ($D_{110}/(D_{311}+D_{110})$) of 0.3 to 0.5; a BET specific surface area value of 5.0 to 60 m$^2$/g; a saturation magnetization value of 90 to 100 Am$^2$/kg as measured with respect to the iron composite particles contained in the purifying agent; a crystallite size of (110) plane of α-Fe of 250 to 400 Å as measured with respect to the iron composite particles contained in the purifying agent; and an Fe content of 70 to 80% by weight as measured with respect to the iron composite particles contained in the purifying agent.

Further, the iron composite particles preserved in the aqueous solution preferably exhibit the following properties after about 6 months from production thereof. That is, the iron composite particles contain coarse particles having a particle diameter of 0.6 to 1.0 μm, and have the above intensity ratio ($D_{110}/(D_{311}+D_{110})$) of 0.2 to 0.3; a BET specific surface area value of 5.0 to 60 m$^2$/g; a saturation magnetization value of 70 to 90 Am$^2$/kg as measured with respect to the iron composite particles contained in the purifying agent; a crystallite size of (110) plane of α-Fe of 250 to 400 Å as measured with respect to the iron composite particles contained in the purifying agent; and an Fe content of 70 to 80% by weight as measured with respect to the iron composite particles contained in the purifying agent.

Next, the method for purifying soil or ground water using the purifying agent according to the present invention is described.

Examples of the organohalogen compounds contained in soil or ground water as objective compounds to be purified by the method of the present invention may include aliphatic organohalogen compounds such as dichloromethane, carbon tetrachloride, 1,2-dichloroethane, 1,1-dichloroethylene, cis-1,2-dichloroethylene, 1,1,1-trichloroethane, 1,1,2-trichloroethane, trichloroethylene, tetrachloroethylene and 1,3-dichloropropane; and aromatic organohalogen compounds such as dioxins and PCB.

The purification treatment of soil or ground water contaminated with organohalogen compounds is generally classified into the "in-situ decomposition" method in which contaminants contained therein are directly decomposed under the ground, and the "in-situ extraction" method in which soil or ground water containing contaminants is excavated or extracted and then the contaminants contained therein are decomposed at the in-situ position. In the present invention, although both of these methods may be usable, the "in-situ decomposition" method is preferably used.

In the in-situ decomposition method, the purifying agent of the present invention may be directly penetrated into the underground, or injected through drilled bore into the underground, using a transferring medium including gas media such as high-pressure air and nitrogen gas, or water. In particular, since the purifying agent of the present invention is in the form of a water suspension, the purifying agent may be directly used, or may be used in the form of a diluted solution according to requirements.

In the in-situ extraction method, the excavated soil may be mixed and stirred with the purifying agent using sand mill, Henschel mixer, concrete mixer, Nauter mixer, single-or twin-screw kneader type mixer, or the like. Also, the pumped ground water may be passed through a column, etc., which are filled with the purifying iron composite particles.

The purifying agent of the present invention may be diluted when used in the purification treatment. The dilution of the purifying agent can be controlled such that the solid content of the iron composite particles contained in the dilute purifying agent is usually 0.1 to 200 g/L.

Also, in the present invention, the dilute purifying agent preferably contains sodium hydrogen carbonate in an amount of usually 0.01 to 1.0% by weight, preferably 0.01 to 0.5% by weight and/or sodium sulfate in an amount of usually 0.01 to 1.0% by weight, preferably 0.04 to 1.0% by weight based on the weight of the diluted purifying agent. The addition of the sodium hydrogen carbonate and/or sodium sulfate allows the purifying agent to be changed in solution properties, thereby contributing to improvement in penetrability thereof into soil.

The dilute purifying agent may be produced by preparing solutions of various additives and then mixing the purifying agent therewith. Meanwhile, the sodium hydrogen carbonate and/or sodium sulfate may be added to the purifying agent after the dilution thereof. As a diluent, there may be used ion-exchanged water.

The amount of the purifying agent used in the present invention may be appropriately determined. In the case where contaminated soil is to be purified, the amount of the purifying agent used is usually 0.1 to 200 g/L, preferably 0.5 to 100 g/L based on 1000 g of the soil. When the amount of the purifying agent used is less than 0.1 g/L, it may be difficult to attain the aimed effects of the present invention. When the amount of the purifying agent used is more than 200 g/L, although the purification effect is enhanced, the use of such a large amount of the purifying agent is uneconomical. Also, in the case where contaminated ground water is to be purified, the amount of the purifying agent used is usually 0.1 to 200 g/L, preferably 0.5 to 100 g/L based on 1000 g of the ground water.

When the organohalogen compounds are purified using the purifying agent of the present invention, the apparent reaction rate constant can be increased to not less than 0.010 $h^{-1}$ as measured by the below-mentioned evaluation method.

When the purifying agent of the present invention is penetrated into soil, it is possible to enhance the penetration percentage to not less than 200% as measured by the below-mentioned evaluation method.

The point of the present invention is that by using the purifying agent of the present invention, organohalogen compounds contained in soil or ground water can be effectively and economically decomposed.

The reasons why the organohalogen compounds contained in soil or ground water can be effectively decomposed by the purifying agent of the present invention, are considered as follows, though it is not clearly determined.

That is, it is considered that in the iron composite particles of the present invention, since the α-Fe phase (0 valence) and $Fe_3O_4$ phase are present therein at a specific ratio, and a part of sulfur is present in a 0 valence form through the heat reduction step, the iron composite particles can exhibit a high reducing activity and, therefore, contribute to the decomposition reaction of the organohalogen compounds.

In the present invention, by incorporating Al to the iron composite particles, the resultant purifying agent can be enhanced in decomposition activity to the organohalogen compounds. The reason therefor is considered as follows, though it is not clearly determined. That is, by incorporating Al into the iron composite particles, the primary particles thereof become much finer, and agglomerates of the iron composite particles show a lower strength as compared to the conventional particles. Therefore, it becomes possible to wet-pulverize the iron composite particles into fine particles with a less difficulty as compared to the case where the same pulverization method is applied to the conventional particles. As a result, it is considered that since the iron composite particles are readily penetrated and dispersed into the soil or ground water, the decomposition activity to organohalogen compounds which is inherent to the iron composite particles can be sufficiently exhibited.

As described above, since the iron composite particles used in the present invention exhibit a high catalytic activity, the purification treatment can be efficiently performed for a short period of time. In particular, the purifying agent of the present invention is suitable for purifying the soil or ground water contaminated with a high-concentration of organohalogen compounds.

Further, the purifying agent of the present invention can be remarkably enhanced in penetrability into soil by incorporating thereinto the polyaspartic acid or salt thereof. As a result, the number of injection sites of the purifying agent can be reduced, resulting in improvement in working efficiency, shortened construction period and economically useful treatment.

In general, fine iron composite particles tend to be agglomerated/aggregated by inter-particle force (electrostatic attraction force) due to fine particles as well as magnetic agglomeration/aggregation due to ferromagnetic particles, thereby failing to sufficiently penetrate into soil. In the present invention, by incorporating the polyaspartic acid or salt thereof as an additive into the purifying agent, the polyaspartic acid or salt thereof adsorbed on the surface of the iron composite particles can impart a large electric charge thereonto in addition to a steric hindrance effect thereof, thereby enhancing an electrostatic repulsion force between the particles and between the particle and the soil. As a result, it is considered that the iron composite particles can be injected into soil while being kept in an non-agglomerated and dispersed state, resulting in remarkable improvement in penetrability thereof into soil or ground water.

Further, it is considered that since both of the polyaspartic acid or salt thereof and the water suspension containing the iron composite particles of the present invention are alkaline, the iron composite particles can be prevented from being deteriorated in quality, decomposition activity to the organohalogen compounds and penetrability into soil by the reaction between the additive and the water suspension containing the iron composite particles.

The purifying agent of the present invention can be more remarkably enhanced in penetrability into soil by further incorporating sodium hydrogen carbonate and/or sodium sulfate thereinto. As a result, the number of injection sites of the purifying agent can be further reduced, resulting in improvement in working efficiency, shortened construction period and economically useful treatment.

Thus, the purifying agent of the present invention can exhibit a high decomposition activity to the organohalogen compounds and an improved penetrability into soil, and, therefore, can be suitably used as an in-situ purifying agent for purifying soil or ground water contaminated with the organohalogen compounds at the in-situ position.

EXAMPLES

The present invention is described in more detail by Examples, but the Examples are only illustrative and, therefore, not intended to limit the scope of the present invention.

Various properties were measured by the following methods.

(1) The average major axis diameter and the aspect ratio of goethite particles were measured from a transmission electron micrograph thereof. The average particle diameters of hematite particles and iron composite particles were measured from a scanning electron micrograph thereof.

(2) The Fe and Al contents in the iron composite particles were measured using an inductively coupled high-frequency plasma atomic emission spectroscope "SPS-4000" manufactured by Seiko Denshi Kogyo Co., Ltd.

(3) The S content of the respective particles was measured using "Carbon and Sulfur Analyzer EMIA-2200" manufactured by Horiba Seisakusho Co., Ltd.

(4) The crystal phase of the respective particles was identified by measuring a crystal structure of the particles in the range of 10 to 90° by X-ray diffraction method.

(5) The peak intensity ratio of the iron composite particles was determined by measuring a diffraction intensity $D_{110}$ of (110) plane of $\alpha$-Fe and a diffraction intensity $D_{311}$ of (311) plane of magnetite from the results of the above X-ray diffraction measurement and calculating a ratio of $D_{110}/(D_{311}+D_{110})$.

(6) The crystallite size ((110) plane of $\alpha$-Fe) of the iron composite particles was expressed by the thickness of crystallite in the direction perpendicular to each crystal plane of the particles as measured by X-ray diffraction method. The thickness value was calculated from the X-ray diffraction peak curve prepared with respect to each crystal plane according to the following Scherrer's formula:

Crystallite Size $D_{110}=K\lambda/\beta \cos \theta$ wherein $\beta$ is a true half value-width of the diffraction peak which was corrected as to the width of machine used (unit: radian); K is a Scherrer constant (=0.9); $\lambda$ is a wavelength of X-ray used (Cu K$\alpha$-ray 0.1542 nm); and $\theta$ is a diffraction angle (corresponding to diffraction peak of each crystal plane).

(7) The specific surface area of the respective particles was expressed by the value measured by BET method using "Monosorb MS-11" manufactured by Cantachrom Co., Ltd.

(8) The saturation magnetization value of the iron composite particles was measured using a vibration sample magnetometer "VSM-3S-15" manufactured by Toei Kogyo Co., Ltd., by applying an external magnetic field of 795.8 kA/m (10 kOe) thereto.

(9) The particle size distribution of the iron composite particles contained in the purifying agent was measured by a laser scattering diffraction type device "NIKKISO MICROTRAC HRA MODEL 9320-X100" manufactured by Nikkiso Co., Ltd. Meanwhile, upon the measurement, ethanol and organosilane were used as dispersing solvent and dispersant, respectively, and the particles were dispersed therein using an ultrasonic dispersing apparatus for one minute.

(10) The amounts of elution of elements other than iron contained in the iron composite particles including cadmium, lead, chromium, arsenic, whole mercury, selenium, whole cyanogen, fluorine and boron, were measured according to "Environmental Standard for Contamination of Soil", Notification No. 46 of the Environmental Agency of Japan, 1991.

(11) The contents of elements other than iron contained in the iron composite particles including cadmium, lead, chromium, arsenic, whole mercury, selenium, whole cyanogen, fluorine and boron were measured according to Notification No. 19 of the Environmental Agency of Japan.

(12) Penetrability test:

About a half length of a glass column having a diameter of 3 cm and a length of 50 cm was previously filled with ion-exchanged water. Then, quartz sand was little by little dropped into the glass column and fully filled therein while shaking the column, thereby forming a saturated soil layer. The particle size distribution of the quartz sand used is shown in the Figure. Meanwhile, the saturated soil layer had initial characteristic values including a porosity of 41.3% and a coefficient of water permeability of $2.43 \times 10^{-2}$ cm/s.

The dilute purifying agent was prepared by adding ion-exchanged water into a mixture of 12.8 mL of the purifying agent containing 4 g of the iron composite particles and an aqueous solution containing 0.67 g of polyaspartic acid or salt thereof such that a total amount of water contained in the aqueous solution of polyaspartic acid or salt thereof, the purifying agent and the ion-exchanged water added was 500 mL.

Next, 500 mL of the thus prepared dilute purifying agent was poured into an upper portion of the saturated soil layer filled in the glass column while maintaining a dropping height of 2 cm above the surface of the saturated soil layer so as to keep the filling pressure constant, thereby conducting a penetrability test by gravity filling method. The glass column was visually observed to examine the degree of penetration of the purifying agent into the soil after completion of pouring a whole amount of the purifying agent.

(13) Preparation of calibration curve: quantitative determination of organohalogen compounds:

The concentration of the organohalogen compounds was calculated from the calibration curve previously prepared according to the following procedure.

Trichloroethylene (TCE: $C_2HCl_3$): molecular weight: 131.39; guaranteed reagent (99.5%); density (at 20° C.): 1.461 to 1.469 g/mL Trichloroethylene was used in three standard amounts (0.05 µL, 0.1 µL and 1.0 µL) in this procedure. 30 mL of ion-exchanged water was added to a 50-mL brown vial bottle (effective capacity: 68 mL). Next, after the respective standard amounts of trichloroethylene were poured into each vial bottle, the vial bottle was immediately closed with a rubber plug with a fluororesin liner, and then an aluminum seal was firmly tightened on the rubber plug.

After allowing the vial bottle to stand at 20° C. for 20 min, 50 µL of a headspace gas in the vial bottle was sampled using a syringe, and the amount of trichloroethylene contained in the sampled gas was measured by "GC-MS-QP5050" manufactured by Shimadzu Seisakusho Co., Ltd. Assuming that trichloroethylene was not decomposed at all, the relationship between the amount of trichloroethylene added and the peak area was determined from the measured values. The above analysis was carried out using a capillary column ("DB-1" manufactured by J & B Scientific Co., Ltd.; liquid phase: dimethyl polysiloxane) and He gas (flow rate: 143 L/min) as a carrier gas. Specifically, the sample was held at 40° C. for 2 min and then heated to 250° C. at a temperature rise rate of 10° C./min for analyzing the gas.

(14) Preparation of samples for decomposition test of organohalogen compounds (object to be tested: water):

A 50-mL brown vial bottle (effective capacity: 68 mL) was filled with the purifying agent as well as ion-exchanged water such that the amount of the iron composite particles contained in the purifying agent was 0.06 g and a total amount of water contained in the purifying agent and the ion-exchanged water added was 30.0 mL. Next, after 1.0 µL of trichloroethylene was poured into the vial bottle, the vial bottle was immediately closed with a rubber plug with a fluororesin liner, and then an aluminum seal was firmly tightened on the rubber plug.

In addition, a 50 mL brown vial bottle (effective capacity: 68 mL) was filled with the purifying agent, an aqueous solution containing 0.1 g of polyaspartic acid or salt thereof as well as ion-exchanged water such that the amount of the iron composite particles contained in the purifying agent was 0.06 g, and a total amount of water contained in the purifying agent, water contained in the aqueous solution of polyaspartic acid or salt thereof, and the ion-exchanged water added was 30.0 mL. Next, after 1.0 μL of trichloroethylene was poured into the vial bottle, the vial bottle was immediately closed with a rubber plug with a fluororesin liner, and then an aluminum seal was firmly tightened on the rubber plug.

(15) Preparation of samples for decomposition test of organohalogen compounds (object to be tested: soil):

1.0 μL of trichloroethylene was previously added to 20 g of wet sandy soil (under 2 mm mesh sieve) to prepare a soil contaminated with trichloroethylene. A 50-mL brown vial bottle (effective capacity: 68 mL) was filled with the purifying agent as well as ion-exchanged water such that the amount of the iron composite particles contained in the purifying agent was 0.06 g and a total amount of water contained in the purifying agent and the ion-exchanged water added was 30.0 mL. Next, after the above-prepared contaminated soil was filled into the vial bottle, the vial bottle was immediately closed with a rubber plug with a fluororesin liner, and then an aluminum seal was firmly tightened on the rubber plug.

In addition, 1.0 μL of trichloroethylene was previously added to 20 g of wet sandy soil (under 2 mm mesh sieve) to prepare a soil contaminated with trichloroethylene. A 50-mL brown vial bottle (effective capacity: 68 mL) was filled with the purifying agent, an aqueous solution containing 0.01 g of polyaspartic acid or salt thereof as well as ion-exchanged water such that the amount of the iron composite particles contained in the purifying agent was 0.06 g, and a total amount of water contained in the purifying agent, water contained in the aqueous solution of polyaspartic acid or salt thereof, and the ion-exchanged water added was 30.0 mL. Next, after the above-prepared contaminated soil was filled into the vial bottle, the vial bottle was immediately closed with a rubber plug with a fluororesin liner, and then an aluminum seal was firmly tightened on the rubber plug.

(16) Evaluation method for decomposition reaction of organohalogen compounds (measurement of apparent reaction rate constant:

The vial bottles containing the samples prepared in the above (14) and (15) were allowed to stand at 24° C. Next, after further allowing the vial bottles to stand at 20° C. for 20 min, 50 μL of a headspace gas in the respective vial bottles was sampled using a syringe to measure a residual amount of trichloroethylene contained therein. Meanwhile, the headspace gas was sampled up to maximum 500 hours at predetermined time intervals by batch method, and was analyzed by "GC-MS-QP5050" manufactured by Shimadzu Seisakusho Co., Ltd., to measure a concentration of the residual trichloroethylene contained in the gas.

The apparent reaction rate constant $k_{obs}$ was calculated from the measured concentration of the residual trichloroethylene according to the following formula:

$$\ln(C/C_0) = -k \cdot t$$

wherein $C_0$ is an initial concentration of trichloroethylene; C is a residual concentration of trichloroethylene; k is an apparent reaction rate constant ($h^{-1}$); and t is a time (h).

Production Example

Goethite particles 1:

A reaction vessel maintained under a non-oxidative atmosphere by flowing $N_2$ gas at a rate of 3.4 cm/s, was charged with 704 L of a 1.16 mol/L $Na_2CO_3$ aqueous solution, and then with 296 L of an aqueous ferrous sulfate solution containing 1.35 mol/L of $Fe^{2+}$ (amount of $Na_2CO_3$: 2.0 equivalents per equivalent of Fe), and the contents in the reaction vessel were mixed and reacted with each other at 47° C. to produce $FeCO_3$.

Successively, the aqueous solution containing the thus obtained $FeCO_3$ was held at 47° C. for 70 min while blowing $N_2$ gas thereinto at a rate of 3.4 cm/s. Thereafter, air was passed through the $FeCO_3$-containing aqueous solution at 47° C. and a flow rate of 2.8 cm/s for 5.0 hours, thereby producing goethite particles. Meanwhile, it was confirmed that the pH value of the aqueous solution during the air passage was maintained at 8.5 to 9.5.

The water suspension containing the thus obtained goethite particles was mixed with 20 L of an aqueous Al sulfate solution containing 0.3 mol/L of $Al^{3+}$, and the resultant mixture was sufficiently stirred and then washed with water using a filter press, thereby obtaining a press cake. The obtained press cake was extrusion-molded and granulated using a compression-molding machine equipped with a mold plate having an orifice diameter of 4 mm, and then dried at 120° C., thereby obtaining a granulated product of the goethite particles.

It was confirmed that the goethite particles constituting the obtained granulated product were spindle-shaped particles having an average major axis diameter of 0.33 μm, an aspect ratio (major axis diameter/minor axis diameter) of 25.0:1, a BET specific surface area of 70 m²/g, an Al content of 0.42% by weight and an S content of 4000 ppm.

Hematite 1:

The above obtained granulated product of the goethite particles were heated at 330° C. to produce hematite particles, and then dry-pulverized. Thereafter, the obtained hematite particles were dehydrated to obtain a press cake. The obtained press cake was extrusion-molded and granulated using a compression-molding machine equipped with a mold plate having an orifice diameter of 3 mm, and then dried at 120° C., thereby obtaining a granulated product of the hematite particles.

It was confirmed that the hematite particles constituting the obtained granulated product were acicular particles having an average major axis diameter of 0.25 μm, an aspect ratio (major axis diameter/minor axis diameter) of 21.4:1, and an S content of 4500 ppm.

Iron Composite Particles 1:

100 g of the granulated product of the goethite particles was introduced into a fixed bed type reducing apparatus, and reduced at 450° C. for 180 min while passing $H_2$ gas therethrough until the goethite particles were completely transformed into α-Fe. Then, after replacing the $H_2$ gas with $N_2$ gas and cooling the obtained iron particles to room temperature, 300 mL of ion-exchanged water was directly introduced into the reducing furnace, and the contents of the reducing furnace were directly taken out therefrom in the form of a water suspension containing the iron particles (iron composite particles 1) in an amount of about 20% by weight.

The water suspension was transferred into a stainless steel beaker equipped with a baffle, and stirred at a rotating speed of 3600 rpm for 30 min using a medium-speed rotation type stirrer "0.2 kW-powered T.K. Homodisper 2.5 Model" with 40 mmφ edged turbine blades (manufactured by Tokushu Kika Kogyo Co., Ltd.) which was inserted into the beaker.

Then, the water suspension was dispersed at a rotating speed of 4000 rpm using a continuous shear type dispersing apparatus "0.55 kW-powered T.K. Homomic Line Mill PL-SL Model" manufactured by Tokushu Kika Kogyo Co., Ltd.

Thereafter, the water suspension was dispersed at a rotating speed of 500 rpm using a media type dispersing apparatus "1.5 kW-powered four-cylinder sand grinder 4TSG-(1/8G) Model" manufactured by Tokushu Kika Kogyo Co., Ltd. which was filled with 0.25 L of 2 mmφ glass beads.

It was confirmed that the thus obtained water suspension had a specific gravity of 1.25, a solid content of 30% by weight, a particle size distribution (of water suspension) with a single peak as measured by laser diffraction scattering method, a median diameter ($D_{50}$) of 1.90 μm, a ratio ($D_{90}/D_{10}$) of 1.81 and a distribution width ($D_{84}-D_{16}$) of 1.10 μm.

Next, a part of the water suspension was sampled and then filtered to separate the solids therefrom, and the separated solids were dried in air at 40° C. for 3 hours, thereby producing iron composite particles.

As a result of observing by a scanning electron microscope (×30000), it was confirmed that the primary particles of the thus obtained iron composite particles were rice grain-like particles having an average major axis diameter of 0.11 μm and an aspect ratio of 1.4:1.

Further, it was confirmed that the thus obtained iron composite particles contained α-Fe as a main component, and had a saturation magnetization value of 141 Am²/kg (141 emu/g), a BET specific surface area of 20 m²/g, a crystallite size of 298 Å, an Fe content of 85.9% by weight and an S content of 5500 ppm. Also, as a result of the X-ray diffraction analysis of the iron composite particles, it was confirmed that both of α-Fe and $Fe_3O_4$ were present therein, and the ratio of a diffraction intensity $D_{110}$ (α-Fe) to a sum of a diffraction intensity $D_{311}$ ($Fe_3O_4$) and the diffraction intensity $D_{110}$ ($D_{110}/(D_{311}+D_{110})$) thereof was 0.88.

<Results of Elution Test of the Iron Composite Particles>

From the results of elution test of the thus obtained iron composite particles according to the above evaluation method (Notification No. 46 of the Environmental Agency of Japan), it was confirmed that the iron composite particles exhibited a cadmium elution of less than 0.001 mg/L, no detected elution of whole cyanogen, a lead elution of less than 0.001 mg/L, a chromium elution of less than 0.01 mg/L, an arsenic elution of less than 0.001 mg/L, a whole mercury elution of less than 0.0005 mg/L, a selenium elution of less than 0.001 mg/L, a fluorine elution of less than 0.5 mg/L, and a boron elution of less than 1 mg/L. Therefore, it was confirmed that all amounts of these elements eluted were below the detection limit of the measuring device used, and lower than the standard values prescribed in the above Environmental Standard.

<Results of Test for Determining Contents of Elements in the Iron Composite Particles>

Also, from the results of the test for determining contents of respective elements contained in the thus obtained iron composite particles according to the above evaluation method (Notification No. 19 of the Environmental Agency of Japan), it was confirmed that the iron composite particles had a cadmium content of less than 0.001 mg/L, no detected content of whole cyanogen, a lead content of less than 0.001 mg/L, a chromium content of less than 0.01 mg/L, an arsenic content of less than 0.001 mg/L, a whole mercury content of less than 0.0005 mg/L, a selenium content of less than 0.001 mg/L, a fluorine content of less than 0.5 mg/L, and a boron content of less than 0.1 mg/L. Therefore, it was confirmed that all contents of these elements were below the detection limit of the measuring device used, and lower than the standard values prescribed in the above Environmental Standard.

Goethite Particles 2:

12.8 L of an aqueous ferrous sulfate solution containing $Fe^{2+}$ in an amount of 1.50 mol/L was mixed with 30.2 L of a 0.44-N NaOH aqueous solution (corresponding to 0.35 equivalent based on $Fe^{2+}$ contained in the aqueous ferrous sulfate solution), and the obtained mixed solution was reacted at a pH of 6.7 and a temperature of 38° C., thereby producing an aqueous ferrous sulfate solution containing $Fe(OH)_2$. Then, air was passed through the aqueous ferrous sulfate solution containing $Fe(OH)_2$ at a temperature of 40° C. and a flow rate of 130 L/min for 3.0 hours, thereby producing goethite core particles.

The aqueous ferrous sulfate solution containing the goethite core particles (in an amount corresponding to 35 mol % based on finally produced goethite particles) was mixed with 7.0 L of a 5.4N $Na_2CO_3$ aqueous solution (corresponding to 1.5 equivalents based on residual $Fe^{2+}$ contained in the aqueous ferrous sulfate solution). Then, air was passed through the obtained mixed solution at a pH of 9.4, a temperature of 42° C. and a flow rate of 130 L/min for 4 hours, thereby producing goethite particles. The suspension containing the thus obtained goethite particles was mixed with 0.96 L of an aqueous Al sulfate solution containing $Al^{3+}$ in an amount of 0.3 mol/L, fully stirred and then washed with water using a filter press, thereby obtaining a press cake. The obtained press cake was extrusion-molded and granulated using a compression-molding machine equipped with a mold plate having an orifice diameter of 4 mm, and then dried at 120° C., thereby obtaining a granulated product of the goethite particles.

It was confirmed that the goethite particles constituting the thus obtained granulated product were acicular particles having an average major axis diameter of 0.30 μm, an aspect ratio (major axis diameter/minor axis diameter) of 12.5:1, a BET specific surface area of 85 m²/g, an Al content of 0.13% by weight and an S content of 400 ppm.

Various properties of the thus obtained goethite particles are shown in Table 1.

Iron Composite Particles 2 to 4:

The same procedure as defined in Production Example was conducted except that kind of goethite particles, heat-dehydrating temperature, addition or non-addition of sulfuric acid to the suspension containing hematite particles as well as amount of the sulfuric acid, if added, and heat-reducing temperature were changed variously, thereby obtaining iron composite particles.

Essential production conditions are shown in Table 2, and various properties of the obtained iron composite particles are shown in Table 3.

Magnetite 1 and Iron Particles 1 to 5:

Magnetite 1 was α-Fe-free magnetite particles obtained by introducing 100 g of a granulated product of Hematite Particles 4 shown in Table 2 into a rotary reducing apparatus, and reducing the granulated product at 300° C. for 180 min while passing $H_2$ gas therethrough until being completely reduced into $Fe_3O_4$.

Further, Iron Particles 1 were iron particles reduced; Iron Particles 2 were electrolytic iron particles; Iron Particles 3 and 4 were carbonyl iron particles; and Iron Particles 5 were sponge iron particles.

Example 1

The water suspension containing the above obtained Iron Composite Particles 1 (solid content of the iron composite particles: 8.0 g/L) was mixed with sodium polyaspartate (tradename: "Baypure DS100" produced by Bayer Chemicals AG) such that the solid content thereof was 1.3 g/L. Next, the obtained water suspension was stirred at a rotating speed of 3600 rpm for 30 min using a medium-speed rotation type stirrer "0.2 kW-powered T.K. Homodisper 2.5 Model" with 40 mmφ edged turbine blades (manufactured by Tokushu Kika Kogyo Co., Ltd.). Further, the water suspension was dispersed at a rotating speed of 4000 rpm using a continuous shear type dispersing apparatus "0.55 kW-powered T.K. Homomic Line Mill PL-SL Model" manufactured by Tokushu Kika Kogyo Co., Ltd., thereby obtaining a purifying agent.

Examples 2 to 28 and Comparative Examples 1 to 25

The same procedure as defined in Example 1 was conducted except that kind and amount of polyaspartic acid or salt thereof as well as kinds and amounts of additives were changed variously as shown in Tables 4 and 5, thereby obtaining a purifying agent.

<Results of Penetrability Test>

The purifying agents obtained in Examples 1 to 15 and Comparative Examples 1 to 14 were subjected to penetrability test using a sand column while variously changing kinds and amounts of purifying agents. The penetrability of the respective purifying agents was evaluated as follows. That is, after completion of the penetration, the sand column was observed to measure a penetration distance of the purifying agent from the upper surface of the column up to the position in which the soil was colored black as a color of the purifying agent. The ratio of the thus measured penetration distance to a penetration distance of the dilute purifying agent containing no additives (Comparative Example 3) was calculated and determined as a penetrability (penetration percentage) of the purifying agent.

With respect to Magnetite 1 and Iron Particles 1 to 5, 25 g of the respective sample particles were dispersed in 75 g of water to prepare a 25 wt % water suspension of the respective sample particles. The thus prepared water suspension was subjected to the same measurement as defined above.

As to the polyaspartic acid or salts thereof as shown in Tables 4 and 5, "DS100" represents "Baypure DS100" produced by Bayer Chemicals AG; and "SPA" represents "AQUADUE SPA" produced by Ajinomoto Co., Ltd.

As the inorganic salts, there were used sodium hydrogen carbonate produced by Kanto Kagaku Co., Ltd., and sodium sulfate produced by Kanto Kagaku Co., Ltd.

As the aspartic acid monomer, there was used a DL-aspartic acid produced by Kanto Kagaku Co., Ltd.

Also, in Tables 4 and 5, "PLAKCEL H5" (tradename) represents polycaprolactone produced by DAICEL KAGAKU KOGYO CO., LTD.; "SURFHOPE" (tradename) represents sucrose stearate produced by MITSUBISHI KAGAKU FOODS CO., LTD.; and "PULRAN" (tradename) represents natural polysaccharide produced by HAYASHIHARA CO., LTD., all of which are hydrophilic polymers.

Meanwhile, in Examples 1 to 15, when a mixture of the purifying agent and sand was swept off from the column after visual observation upon completion of the penetration, it was confirmed that the black-colored purifying agent was uniformly dispersed in the sand and, therefore, no banding or segregation thereof was recognized.

In Comparative Examples 6 to 10, the iron particles were immediately precipitated due to coarse particles, and stayed at the upper portion of the sand filled in the column, so that substantially no penetration of the iron particles into the soil was recognized.

In Comparative Example 11 using the aspartic acid monomer as the additive, it was confirmed that the addition of the additive was insufficient to prevent the iron composite particles from being agglomerated together owing to steric hindrance between molecules of the additive, so that substantially no penetration of the iron composite particles into the soil was recognized.

In Comparative Examples 12 to 14 using the water-insoluble additives, it was confirmed that the additives were stayed at the upper portion of the sand filled in the column, and, therefore, failed to contribute to improvement in penetrability into soil.

The evaluation results are shown in Tables 4 and 5.

<Results of Purification Treatment of Organohalogen Compounds (Apparent Reaction Rate Constant) (Object to be Treated: Water)>

In Examples 16 to 28 and Comparative Examples 15 to 25, the kind and amount of purifying agent were changed variously to measure apparent reaction rate constants thereof.

Essential treatment conditions and the measurement results are shown in Tables 6 and 7.

Meanwhile, in Comparative Examples 19 to 21, since substantially no decomposition of trichloroethylene was caused, the apparent reaction rate constant was unmeasurable.

<Results of Purification Treatment of Organohalogen Compounds (Apparent Reaction Rate Constant) (Object to be Treated: Soil)>

In Examples 16 to 28 and Comparative Examples 15 to 25, the kind and amount of purifying agent were changed variously to measure apparent reaction rate constants thereof.

Essential treatment conditions and the measurement results are shown in Tables 6 and 7.

Meanwhile, in Comparative Examples 19 to 21, since substantially no decomposition of trichloroethylene was caused, the apparent reaction rate constant was unmeasurable.

TABLE 1

| | Properties of goethite particles | | |
|---|---|---|---|
| Goethite particles | Shape | Average major axis diameter (μm) | Aspect ratio (—) |
| Goethite particles 1 | Acicular | 0.33 | 25.0:1 |
| Goethite particles 2 | Spindle-shaped | 0.30 | 12.5:1 |

TABLE 1-continued

Properties of goethite particles

| Goethite particles | BET specific surface area ($m^2/g$) | Al content (wt %) | S content (ppm) |
|---|---|---|---|
| Goethite particles 1 | 70 | 0.42 | 4000 |
| Goethite particles 2 | 85 | 0.13 | 400 |

TABLE 2

| Hematite particles | Kind of goethite particles used | Heat-dehydrating temperature (° C.) | Average particle diameter of hematite particles (μm) |
|---|---|---|---|
| Hematite 1 | Goethite particles 1 | 330 | 0.25 |
| Hematite 2 | Goethite particles 1 | 260 | 0.24 |
| Hematite 3 | Goethite particles 2 | 300 | 0.24 |
| Hematite 4 | Goethite particles 1 | 330 | 0.25 |
| Hematite 5 | Goethite particles 2 | 300 | 0.24 |

| Hematite particles | Amount of sulfuric acid added (mL/kg) | S content (ppm) | Reducing temperature (° C.) |
|---|---|---|---|
| Hematite 1 | — | 4500 | 450 |
| Hematite 2 | — | 4500 | 360 |
| Hematite 3 | 10 | 3300 | 430 |
| Hematite 4 | 25 | 7300 | 400 |
| Hematite 5 | 10 | 3300 | 300 |

TABLE 3

| Iron-based particles | Kind of hematite particles used | Properties of purifying iron composite particles | |
|---|---|---|---|
| | | Average particle diameter (μm) | BET specific surface ($m^2/g$) |
| Iron composite particles 1 | Hematite 1 | 0.11 | 20 |
| Iron composite particles 2 | Hematite 2 | 0.09 | 33 |
| Iron composite particles 3 | Hematite 3 | 0.09 | 25 |
| Iron composite particles 4 | Hematite 4 | 0.10 | 28 |
| Magnetite particles 1 | Hematite 5 | 0.24 | 52 |
| Iron particles 1 | — | 100 | 0.05 |
| Iron particles 2 | — | 50 | 0.03 |
| Iron particles 3 | — | 7.5 | 0.1 |
| Iron particles 4 | — | 1.65 | 0.7 |
| Iron particles 5 | — | 180 | 0.2 |

TABLE 3-continued

| Iron-based particles | Properties of purifying iron composite particles | | |
|---|---|---|---|
| | Fe content (wt %) | Al content (wt %) | S content (ppm) |
| Iron composite particles 1 | 85.9 | 0.68 | 5500 |
| Iron composite particles 2 | 76.0 | 0.68 | 5500 |
| Iron composite particles 3 | 87.2 | 0.22 | 4000 |
| Iron composite particles 4 | 85.7 | 0.55 | 8500 |
| Magnetite particles 1 | 66.9 | 0.05 | 4000 |
| Iron particles 1 | 98.2 | 0.00 | 30 |
| Iron particles 2 | 98.3 | 0.00 | 50 |
| Iron particles 3 | 98.8 | 0.00 | 2 |
| Iron particles 4 | 99.1 | 0.00 | 2 |
| Iron particles 5 | 99.0 | 0.00 | 3 |

| Iron-based particles | Properties of purifying iron composite particles | | |
|---|---|---|---|
| | Crystallite size $D_{110}$ (Å) | Saturation magnetization value (σs) ($Am^2/kg$) | (emu/g) |
| Iron composite particles 1 | 298 | 141 | 141 |
| Iron composite particles 2 | 200 | 93 | 93 |
| Iron composite particles 3 | 292 | 144 | 144 |
| Iron composite particles 4 | 301 | 133 | 133 |
| Magnetite particles 1 | — | 76 | 76 |
| Iron particles 1 | 440 | 204 | 204 |
| Iron particles 2 | 430 | 208 | 208 |
| Iron particles 3 | 256 | 208 | 208 |
| Iron particles 4 | 93 | 203 | 203 |
| Iron particles 5 | 221 | 197 | 197 |

| Iron-based particles | Properties of purifying iron composite particles | |
|---|---|---|
| | Crystal phase | X-ray diffraction intensity ratio $D_{110}/(D_{110} + D_{311})$ (—) |
| Iron composite particles 1 | α-Fe and $Fe_3O_4$ mixed phase | 0.88 |
| Iron composite particles 2 | α-Fe and $Fe_3O_4$ mixed phase | 0.35 |

TABLE 3-continued

| | | |
|---|---|---|
| Iron composite particles 3 | α-Fe and $Fe_3O_4$ mixed phase | 0.90 |
| Iron composite particles 4 | α-Fe and $Fe_3O_4$ mixed phase | 0.92 |
| Magnetite particles 1 | $Fe_3O_4$ single phase | — |
| Iron particles 1 | α-Fe single phase | 1.00 |
| Iron particles 2 | α-Fe single phase | 1.00 |
| Iron particles 3 | α-Fe single phase | 1.00 |
| Iron particles 4 | α-Fe single phase | 1.00 |
| Iron particles 5 | α-Fe single phase | 1.00 |

TABLE 4

| Examples | Kind of purifying agent | Solid content of iron composite particles (g/L) |
|---|---|---|
| Example 1 | Iron composite particles 1 | 8.0 |
| Example 2 | Iron composite particles 1 | 8.0 |
| Example 3 | Iron composite particles 2 | 8.0 |
| Example 4 | Iron composite particles 3 | 8.0 |
| Example 5 | Iron composite particles 4 | 8.0 |
| Example 6 | Iron composite particles 1 | 8.0 |
| Example 7 | Iron composite particles 1 | 8.0 |
| Example 8 | Iron composite particles 1 | 3.3 |
| Example 9 | Iron composite particles 1 | 70 |
| Example 10 | Iron composite particles 1 | 8.0 |
| Example 11 | Iron composite particles 1 | 8.0 |
| Example 12 | Iron composite particles 1 | 8.0 |
| Example 13 | Iron composite particles 1 | 8.0 |
| Example 14 | Iron composite particles 1 | 8.0 |
| Example 15 | Iron composite particles 1 | 8.0 |

| | Polyaspartic acid | |
|---|---|---|
| Examples | Kind | Solid content (g/L) |
| Example 1 | DS100 | 1.3 |
| Example 2 | SPA | 1.3 |
| Example 3 | DS100 | 1.3 |
| Example 4 | DS100 | 1.3 |
| Example 5 | DS100 | 1.3 |
| Example 6 | DS100 | 0.8 |
| Example 7 | DS100 | 8.0 |
| Example 8 | DS100 | 0.6 |
| Example 9 | DS100 | 11.7 |
| Example 10 | DS100 | 1.3 |
| Example 11 | DS100 | 1.3 |
| Example 12 | DS100 | 1.3 |
| Example 13 | DS100 | 1.3 |
| Example 14 | DS100 | 1.3 |
| Example 15 | DS100 | 1.3 |

| Examples | $NaHCO_3$ content (wt %) | $Na_2SO_4$ content (wt %) | Penetrability (%) |
|---|---|---|---|
| Example 1 | — | — | 480 |
| Example 2 | — | — | 460 |
| Example 3 | — | — | 470 |
| Example 4 | — | — | 470 |
| Example 5 | — | — | 430 |
| Example 6 | — | — | 360 |
| Example 7 | — | — | 520 |
| Example 8 | — | — | 290 |
| Example 9 | — | — | 470 |
| Example 10 | 0.02 | 0.22 | 550 |
| Example 11 | 0.06 | 0.42 | 740 |
| Example 12 | 0.06 | — | 540 |
| Example 13 | 0.15 | — | 710 |
| Example 14 | — | 0.23 | 550 |
| Example 15 | — | 0.91 | 750 |

TABLE 5

| Comparative Examples | Kind of purifying agent | Solid content of iron composite particles (g/L) |
|---|---|---|
| Comparative Example 1 | Iron composite particles 1 | 1.0 |
| Comparative Example 2 | Iron composite particles 1 | 3.3 |
| Comparative Example 3 | Iron composite particles 1 | 8.0 |
| Comparative Example 4 | Iron composite particles 1 | 32 |
| Comparative Example 5 | Magnetite particles 1 | 8.0 |
| Comparative Example 6 | Iron particles 1 | 8.0 |
| Comparative Example 7 | Iron particles 2 | 8.0 |
| Comparative Example 8 | Iron particles 3 | 8.0 |
| Comparative Example 9 | Iron particles 4 | 8.0 |
| Comparative Example 10 | Iron particles 5 | 8.0 |
| Comparative Example 11 | Iron composite particles 1 | 8.0 |
| Comparative Example 12 | Iron composite particles 1 | 8.0 |
| Comparative Example 13 | Iron composite particles 1 | 8.0 |
| Comparative Example 14 | Iron composite particles 1 | 8.0 |

| | Polyaspartic acid | |
|---|---|---|
| Comparative Examples | Kind | Solid content (g/L) |
| Comparative Example 1 | — | — |
| Comparative Example 2 | — | — |
| Comparative Example 3 | — | — |
| Comparative Example 4 | — | — |
| Comparative Example 5 | DS100 | 1.3 |
| Comparative Example 6 | DS100 | 1.3 |
| Comparative Example 7 | DS100 | 1.3 |
| Comparative Example 8 | DS100 | 1.3 |
| Comparative Example 9 | DS100 | 1.3 |
| Comparative Example 10 | DS100 | 1.3 |
| Comparative Example 11 | Aspartic acid | 1.3 |
| Comparative Example 12 | PULRAN | 1.3 |
| Comparative Example 13 | SURFHOPE | 1.3 |
| Comparative Example 14 | PLAKCEL H5 | 1.3 |

TABLE 5-continued

| Comparative Examples | NaHCO$_3$ content (wt %) | Na$_2$SO$_4$ content (wt %) | Penetrability (%) |
|---|---|---|---|
| Comparative Example 1 | — | — | 50 |
| Comparative Example 2 | — | — | 80 |
| Comparative Example 3 | — | — | 100 |
| Comparative Example 4 | — | — | 95 |
| Comparative Example 5 | — | — | 20 |
| Comparative Example 6 | — | — | 10 |
| Comparative Example 7 | — | — | 10 |
| Comparative Example 8 | — | — | 10 |
| Comparative Example 9 | — | — | 10 |
| Comparative Example 10 | — | — | 10 |
| Comparative Example 11 | — | — | 120 |
| Comparative Example 12 | — | — | 100 |
| Comparative Example 13 | — | — | 100 |
| Comparative Example 14 | — | — | 100 |

TABLE 6

| Examples | Kind of purifying agent | Solid content of iron composite particles (g/L) |
|---|---|---|
| Example 16 | Iron composite particles 1 | 2.0 |
| Example 17 | Iron composite particles 1 | 2.0 |
| Example 18 | Iron composite particles 2 | 2.0 |
| Example 19 | Iron composite particles 3 | 2.0 |
| Example 20 | Iron composite particles 4 | 2.0 |
| Example 21 | Iron composite particles 1 | 2.0 |
| Example 22 | Iron composite particles 1 | 2.0 |
| Example 23 | Iron composite particles 1 | 2.0 |
| Example 24 | Iron composite particles 1 | 2.0 |
| Example 25 | Iron composite particles 1 | 2.0 |
| Example 26 | Iron composite particles 1 | 2.0 |
| Example 27 | Iron composite particles 1 | 2.0 |
| Example 28 | Iron composite particles 1 | 2.0 |

| Examples | Polyaspartic acid Kind | Solid content (g/L) |
|---|---|---|
| Example 16 | DS100 | 0.3 |
| Example 17 | SPA | 0.3 |
| Example 18 | DS100 | 0.3 |
| Example 19 | DS100 | 0.3 |
| Example 20 | DS100 | 0.3 |
| Example 21 | DS100 | 0.2 |
| Example 22 | DS100 | 8.0 |
| Example 23 | DS100 | 0.3 |
| Example 24 | DS100 | 0.3 |
| Example 25 | DS100 | 0.3 |
| Example 26 | DS100 | 0.3 |
| Example 27 | DS100 | 0.3 |
| Example 28 | DS100 | 0.3 |

TABLE 6-continued

| Examples | NaHCO$_3$ content (wt %) | Na$_2$SO$_4$ content (wt %) | $k_{obs}$ Soil (1/h) | $k_{obs}$ Water (1/h) |
|---|---|---|---|---|
| Example 16 | — | — | 0.014 | 0.014 |
| Example 17 | — | — | 0.014 | 0.015 |
| Example 18 | — | — | 0.014 | 0.015 |
| Example 19 | — | — | 0.014 | 0.016 |
| Example 20 | — | — | 0.012 | 0.011 |
| Example 21 | — | — | 0.014 | 0.016 |
| Example 22 | — | — | 0.012 | 0.014 |
| Example 23 | 0.02 | 0.22 | 0.013 | 0.015 |
| Example 24 | 0.06 | 0.42 | 0.013 | 0.014 |
| Example 25 | 0.06 | — | 0.014 | 0.014 |
| Example 26 | 0.15 | — | 0.013 | 0.015 |
| Example 27 | — | 0.23 | 0.014 | 0.015 |
| Example 28 | — | 0.91 | 0.013 | 0.016 |

TABLE 7

| Comparative Examples | Kind of purifying agent | Solid content of iron composite particles (g/L) |
|---|---|---|
| Comparative Example 15 | Iron composite particles 1 | 2.0 |
| Comparative Example 16 | Magnetite particles 1 | 2.0 |
| Comparative Example 17 | Iron particles 1 | 2.0 |
| Comparative Example 18 | Iron particles 2 | 2.0 |
| Comparative Example 19 | Iron particles 3 | 2.0 |
| Comparative Example 20 | Iron particles 4 | 2.0 |
| Comparative Example 21 | Iron particles 5 | 2.0 |
| Comparative Example 22 | Iron composite particles 1 | 2.0 |
| Comparative Example 23 | Iron composite particles 1 | 2.0 |
| Comparative Example 24 | Iron composite particles 1 | 2.0 |
| Comparative Example 25 | Iron composite particles 1 | 2.0 |

| Comparative Examples | Polyaspartic acid Kind | Solid content (g/L) |
|---|---|---|
| Comparative Example 15 | — | — |
| Comparative Example 16 | DS100 | 0.3 |
| Comparative Example 17 | DS100 | 0.3 |
| Comparative Example 18 | DS100 | 0.3 |
| Comparative Example 19 | DS100 | 0.3 |
| Comparative Example 20 | DS100 | 0.2 |
| Comparative Example 21 | DS100 | 8.0 |
| Comparative Example 22 | Aspartic acid | 0.3 |
| Comparative Example 23 | PULRAN | 0.3 |
| Comparative Example 24 | SURFHOPE | 0.3 |
| Comparative Example 25 | PLAKCEL H5 | 0.3 |

TABLE 7-continued

| Comparative Examples | NaHCO$_3$ content (wt %) | Na$_2$SO$_4$ content (wt %) | k$_{obs}$ Soil (1/h) | k$_{obs}$ Water (1/h) |
|---|---|---|---|---|
| Comparative Example 15 | — | — | 0.017 | 0.019 |
| Comparative Example 16 | — | — | 0.0007 | 0.0009 |
| Comparative Example 17 | — | — | 0.0006 | 0.0008 |
| Comparative Example 18 | — | — | 0.0008 | 0.0009 |
| Comparative Example 19 | — | — | Not decomposed | Not decomposed |
| Comparative Example 20 | — | — | Not decomposed | Not decomposed |
| Comparative Example 21 | — | — | Not decomposed | Not decomposed |
| Comparative Example 22 | — | — | 0.015 | 0.017 |
| Comparative Example 23 | — | — | 0.015 | 0.016 |
| Comparative Example 24 | — | — | 0.015 | 0.019 |
| Comparative Example 25 | — | — | 0.018 | 0.020 |

What is claimed is:

1. A purifying agent for purifying soil or ground water, comprising a water suspension containing:
   iron composite particles comprising α-Fe and magnetite, and having an average particle diameter of 0.05 to 0.50 µm, an S content of 3500 to 10000 ppm and an Al content of 0.10 to 1.50% by weight; and
   polyaspartic acid or a salt thereof; and
   wherein said iron composite particles contained in the purifying agent are present in an amount of 10 to 30% by weight based on the weight of the purifying agent, and said polyaspartic acid or salt thereof is present in an amount of 5 to 50% by weight based on the weight of the iron composite particles.

2. A purifying agent according to claim 1, further comprising as an additional component, sodium hydrogen carbonate, sodium sulfate or a mixture thereof.

3. A purifying agent according to claim 1, wherein said iron composite particles have a ratio of a diffraction intensity $D_{110}$ of (110) plane of α-Fe to a sum of a diffraction intensity $D_{311}$ of (311) plane of magnetite and the diffraction intensity $D_{110}$ ($D_{110}/(D_{311}+D_{110})$) of 0.30 to 0.95.

4. A purifying agent according to claim 1, wherein said iron composite particles have a saturation magnetization value of 85 to 190 Am$^2$/kg, and a crystallite size of (110) plane of α-Fe of 200 to 400 Å.

5. A dilute purifying agent for purifying soil or ground water, comprising a water suspension containing:
   iron composite particles comprising α-Fe and magnetite, and having an average particle diameter of 0.05 to 0.50 µm, an S content of 3500 to 10000 ppm and an Al content of 0.10 to 1.50% by weight; and
   polyaspartic acid or a salt thereof,
   wherein the amount of the iron composite particles (as a solid content) in the purifying agent is 0.1 to 200 g/L, and said polyaspartic acid or salt thereof is present in an amount of 5 to 50% by weight based on the weight of the iron composite particles.

6. A dilute purifying agent according to claim 5, further comprising as an additional component, sodium hydrogen carbonate, sodium sulfate or a mixture thereof,
   the amount of sodium hydrogen carbonate, sodium sulfate or a mixture thereof (as a solid content) in the purifying agent being 0.01 to 1.0% by weight.

* * * * *